United States Patent [19]
Chou

[11] Patent Number: 5,327,238
[45] Date of Patent: Jul. 5, 1994

[54] METHOD AND APPARATUS FOR MODULATING A SEPARATED TELEVISION HORIZONTAL SYNC PULSE AS A SUBCARRIER OF AUDIO INFORMATION

[76] Inventor: Wayne W. Chou, 25 Hauley Pl., Ridgefield, Conn. 06877

[21] Appl. No.: 974,138

[22] Filed: Nov. 10, 1992

[51] Int. Cl.$^5$ .................... H04N 7/093; H04N 7/18; H04N 7/10
[52] U.S. Cl. ................................ 348/473; 375/22
[58] Field of Search ............. 358/145, 143, 142, 147, 358/86, 148; 370/9, 110.4; 375/22; H04N 7/093, 7/18, 7/10

[56] References Cited

U.S. PATENT DOCUMENTS

| | | | |
|---|---|---|---|
| 2,268,001 | 12/1941 | Felgel-Farnholz | 358/145 |
| 2,295,023 | 9/1942 | Beatty et al. | 358/17 |
| 2,350,902 | 6/1944 | Kallmann | 358/145 |
| 2,391,176 | 12/1945 | Fredendall | 307/102 |
| 2,401,384 | 6/1946 | Young, Jr. | 358/145 |
| 2,500,839 | 3/1950 | Lord | 358/154 |
| 2,563,684 | 8/1951 | Lord | 358/198 |
| 2,590,306 | 3/1952 | Fredendall et al. | 358/198 |
| 2,624,797 | 1/1953 | Lawson et al. | 358/145 |
| 2,671,130 | 3/1954 | Weighton et al. | 358/145 |
| 3,876,830 | 4/1975 | Verhoeven et al. | 358/188 |
| 4,054,910 | 10/1977 | Chou et al. | 358/86 |
| 4,333,108 | 6/1982 | Quan et al. | 358/145 |
| 4,442,461 | 4/1984 | Shirai et al. | 358/145 |
| 4,488,183 | 12/1984 | Kinjo | 358/319 |
| 4,783,699 | 11/1988 | DePaul | 358/145 |
| 4,945,403 | 7/1990 | Kubo et al. | 358/145 |

FOREIGN PATENT DOCUMENTS 2071458 9/1981 United Kingdom .............. 358/145

*Primary Examiner*—James J. Groody
*Assistant Examiner*—Safet Metjahic
*Attorney, Agent, or Firm*—Parmalee, Bollinger & Bramblett

[57] ABSTRACT

A closed circuit television communication system for the transmission and reception of original video signals over wires is provided in which separated horizontal sync pulses of the original video signal are pulse width modulated by an audio signal, enabling the video signal to carry additional information which can be recovered on reception. The horizontal sync pulses are separated from the original video signal which are pulse width modulated to form a pulse which varies linearly with an audio input signal. The horizontal sync pulses are replaced in the original video signal with the pulse width modulated pulses while preserving the original video signal levels surrounding the replaced video area. The reconstituted video signal is transmitted over wire, received and the pulse width modulated pulses from the reconstituted video signal are separated and demodulated to produce an audio output signal along with the original video signal.

7 Claims, 4 Drawing Sheets

METHOD AND APPARATUS FOR MODULATING A SEPARATED TELEVISION HORIZONTAL SYNC PULSE AS A SUBCARRIER OF AUDIO INFORMATION

BACKGROUND OF THE INVENTION

This invention relates to a closed circuit television communication system for the transmission and reception of original video signals over wire, and more particularly to such a system in which the sync pulses are separated from the original video signal and are pulse width modulated by an audio signal, thereby enabling the video signal to carry additional information in the closed circuit system which can be recovered on reception.

Typical closed circuit television transmission over coaxial cable or wire may have restricted signal carrying capacity. In order to send additional information, such as audio signals, between the same points as the video signals, additional transmission lines and circuits are required. Some installations within or from one building to another may not be able to accommodate additional lines or may be impractical and/or uneconomical. Accordingly, sending both video and additional audio information over the same transmission line would be highly desirable.

SUMMARY OF THE INVENTION

Accordingly, it is an object of this invention to provide a communication system for the transmission of closed circuit television signals over wire which can also be used to transmit additional information using the horizontal sync pulses of the television signals.

A further object of this invention is to provide a practical and economical method in a closed circuit television system in which a television sync pulse is modulated by an audio signal to permit the television signal to carry additional information which can be recovered by demodulation at the receiving end.

An additional object of the present invention is to provide a method and apparatus for a closed circuit television communication system which permits the passing of the color bursts signal in a color television signal which could become lost in the process of modulating the horizontal sync pulses of the color signal in accordance with the present invention.

Still another object of the present invention is to provide a method of removing the horizontal sync pulse from a television signal, modulating that signal with audio and replacing the original pulse with the new varying width pulse while preserving all the original levels and signals in the television signal surrounding the replaced area.

In carrying out this invention in one illustrative embodiment thereof, a closed circuit television communication system for the transmission and reception of original video signals over wire in which the separated horizontal sync pulse of the original video signal is pulse width modulated by an audio signal, enabling the video signal to carry additional information which can be recovered on reception. Horizontal sync pulses are separated from an original video signal and means are provided for forming a pulse width modulated pulse which varies linearly with an audio input signal. Pulse width modulated pulses replace the horizontal sync pulses of the original video signal while preserving the original video signal levels surrounding the replaced video signal area, thereby providing a reconstituted video signal. The reconstituted video signal is transmitted over wire and received by a reception means. Means are provided for separating the pulse width modulated pulses from the reconstituted video signals and for demodulating the pulse width modulated signals to produce an audio signal. The reception means also has means for reconstructing the original video signal.

BRIEF DESCRIPTION OF THE DRAWINGS

The invention together with further objects, features, advantages and aspects thereof will be more clearly understood from the following description taken in connection with the accompanying drawings.

DESCRIPTION OF THE PREFERRED EMBODIMENTS

Figure 1:
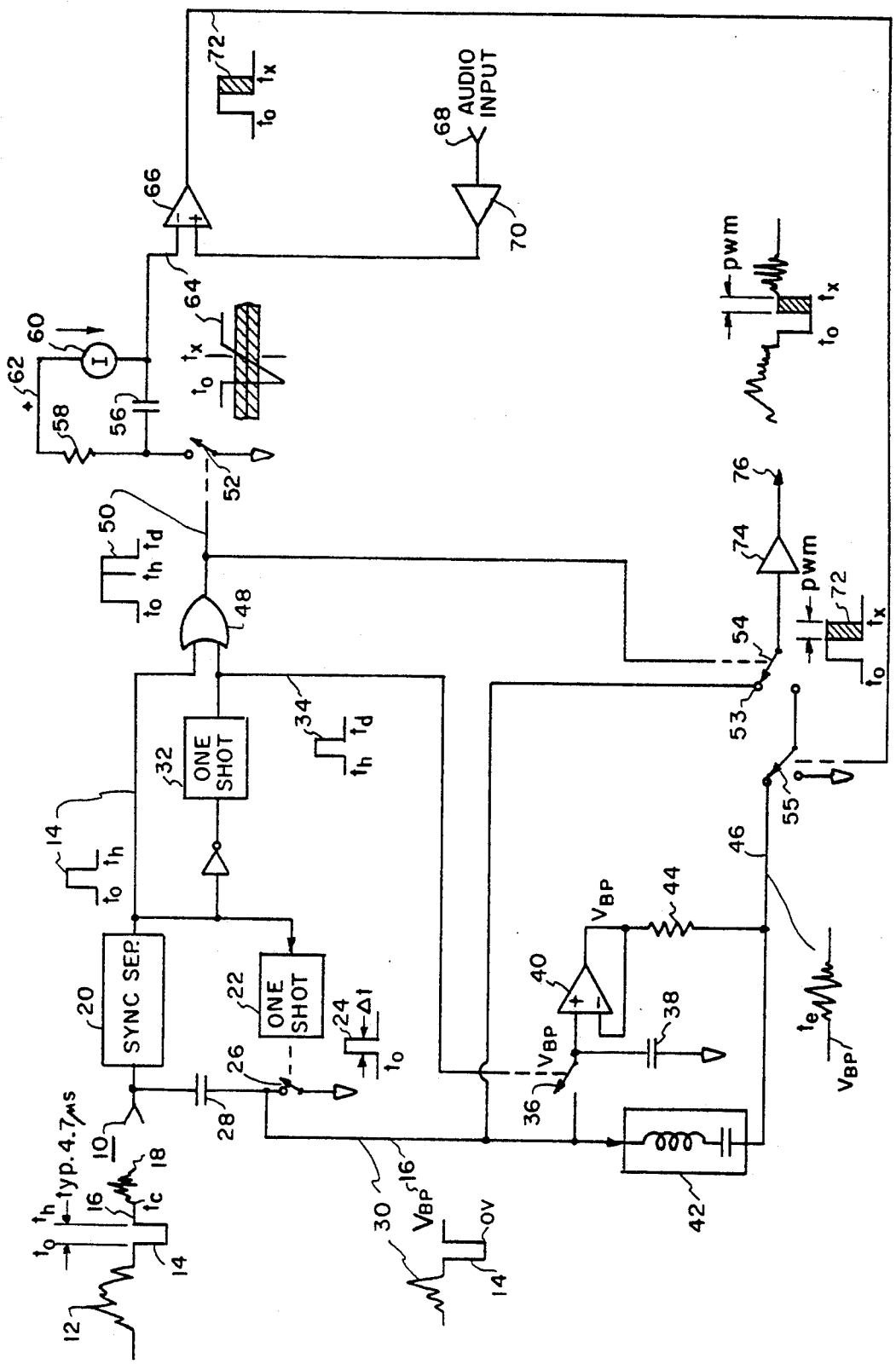
FIG. 1 is a schematic diagram for the separation, pulse width modulation and the reconstitution of the video signal at the transmitting end of a closed circuit communications system in accordance with the present invention.

In accordance with the communications system of the present invention, at the transmission end of the system the sync pulse is separated from the video signal. A pulse is then created which varies linearly with an audio input signal and then the original sync pulse is replaced with the new varying pulse while preserving all the original levels and signals of the video signals surrounding the replaced area. Referring now to FIG. 1 which is a block diagram of the transmitting end of the communications system in accordance with the present invention, a composite video signal 10 containing video information components 12, horizontal sync pulses 14 followed by a back porch reference voltage level 16 and a color burst 18 is applied to a sync separator 20. The separated sync pulse 14 has a typical duration of 4.7 microseconds. The leading edge $t_o$ of the separated sync pulse 14 triggers a one-shot multivibrator 22 which generates a pulse 24 having a time period t where t is very small compared to the horizontal sync pulse 14. Pulse 4 closes a switch 26 to ground or any other reference level.

It should be noted that all switches in FIG. 1 are shown in normal "off" positions. Simultaneous therewith the video signal 10 is AC coupled through a capacitor 28 to produce a DC restored video signal 30 with the horizontal sync pulse 14 at the reference ground potential of 0 volts. The purpose of the DC restoration of the signal is to enable the back porch voltage 16 to be measured and stored for future reinsertion. Without a signal that is properly referenced, the back porch voltage ($V_{BP}$) 16 would change continuously in accordance with the average video signal level which changes with the brightness of the scene. Since back porch voltage 16 occurs after the horizontal sync pulse 14, a one-shot multivibrator 32 is utilized to create a sample and hold pulse 34 which occurs after the sync pulse 14. Sample and hold pulse 34 is then used to close a switch 36 effectively applying the back porch voltage 16 to a capacitor 38 which stores back porch voltage 16 once for every line time. A buffer amplifier 40 preserves the back porch voltage 16 at its output which is then mixed with the original color burst signal 18, if any, through the band pass filter 42 and resistor 44 onto line 46.

Meanwhile, the sync pulse 14 and the sample and hold pulse 45 are combined in an an OR gate circuit 48 to produce a stretched pulse 50. The stretched pulse 50 is of longer duration than the original sync pulse 14. The stretched pulse 50 activates a pair of switches 52 and 54. A capacitor 56 is connected through a resistor 58 and a constant current generator 60 to a supply voltage 62. The capacitor 56 has a net zero charge initially through the resistor 58 and the constant current generator 60 which is sourced from the same supply voltage 62. At the instant the switch 52 is closed and held for the duration of the stretched pulse 50, voltage 64 is applied to the negative input of a comparator 66. Voltage 64 drops to reference ground and begins to rise at a constant rate over time governed by the values of capacitor 56 and the constant current generator 60. An audio input 68 is connected through an amplifier 70 to the positive side of the comparator 66 and is optimally averaged midway between reference ground and the positive power supply 62 so that with the initial closing of the switch 52, the output 72 of the comparator 66 will rise accordingly and remain high until the ramp voltage exceeds the audio voltage, thus producing a pulse width proportional to the audio input 68.

Switch 54 is connected through an output amplifier 74 having a reconstituted video signal output 76. The reconstituted output 76 is achieved by closing switch 54 to switch 55 during stretched pulse 50 so that all the signals through to the output 76 are either switched from 1) the original DC restored video signal 30 through normal contact 53 of the switch 54 or 2) from switch 55 which duration is governed by the modulation and chooses between reference ground during the pulse width modulated generated or the mixed signal 46 of the back porch voltage VBP and the color burst signal 18. The output 76 may be used in any standard transmission media since it is identical in all respects to the original composite video signal 10 except for a varying width horizontal sync pulse 72.

The reconstituted composite video signal 76 containing the pulse width modulated horizontal sync pulse is then transmitted over coaxial cable or may be transmitted over an ordinary pair of wires, for example, telephone wires, lamp cord, BX cable, etc. over limited distances without measurable degradation of picture quality in accordance with the communications system disclosed in U.S. Pat. No. 4,054,910. On the receiving end of the communications system the pulse width modulated horizontal sync pulse in the reconstituted video signal 76 must be converted back to audio to make it useful as well as to restore the video with a fixed standard horizontal sync pulse. Otherwise the varying width horizontal sync pulse would create a distorted video picture proportional to the audio signal.

Figure 2A:
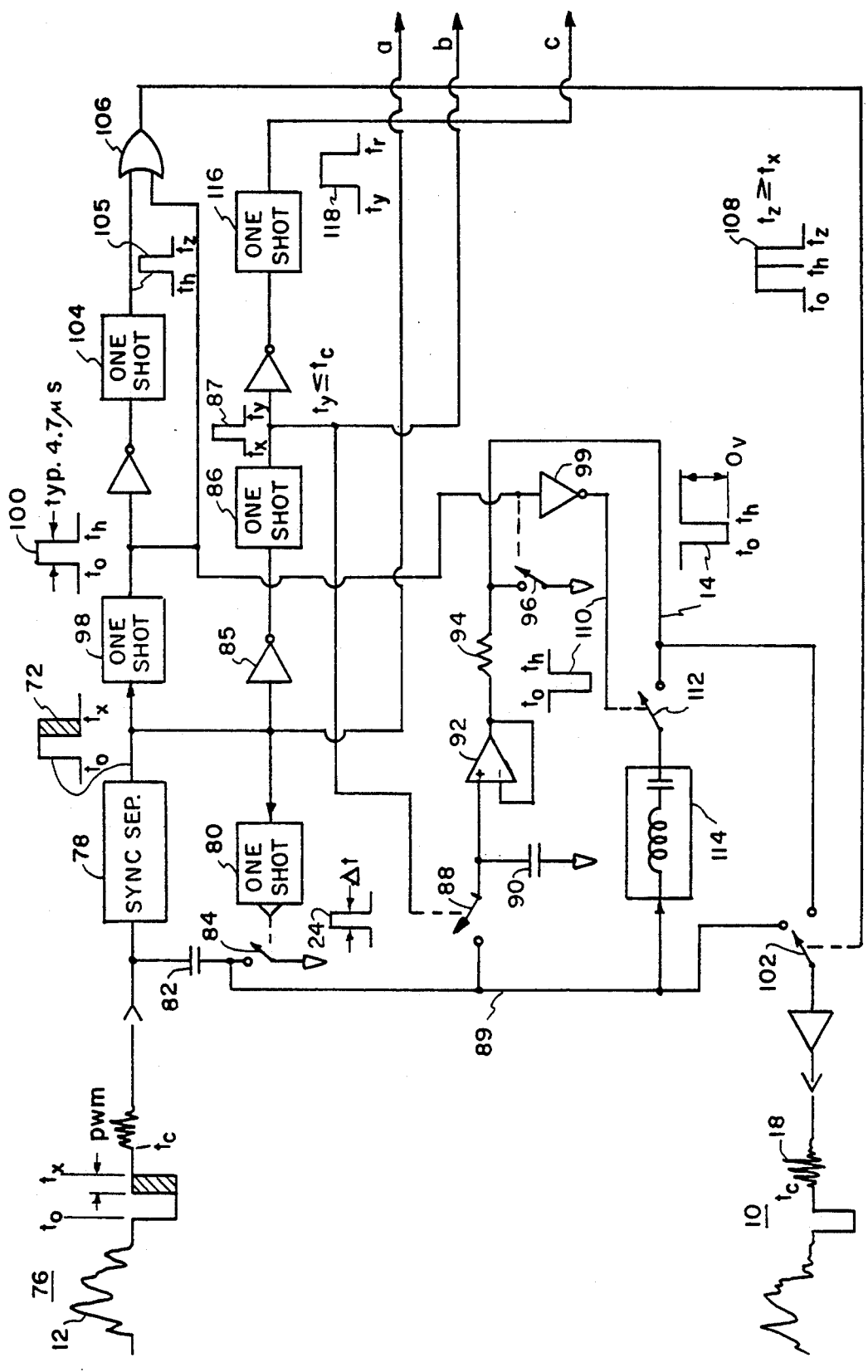
FIGS. 2 A and 2 B are schematic diagrams of the reception end of the communications system in accordance with the present invention which separates and demodulates the pulse width modulated horizontal sync pulse and reconstitutes the original television signal in accordance with the present invention.
Figure 2B:
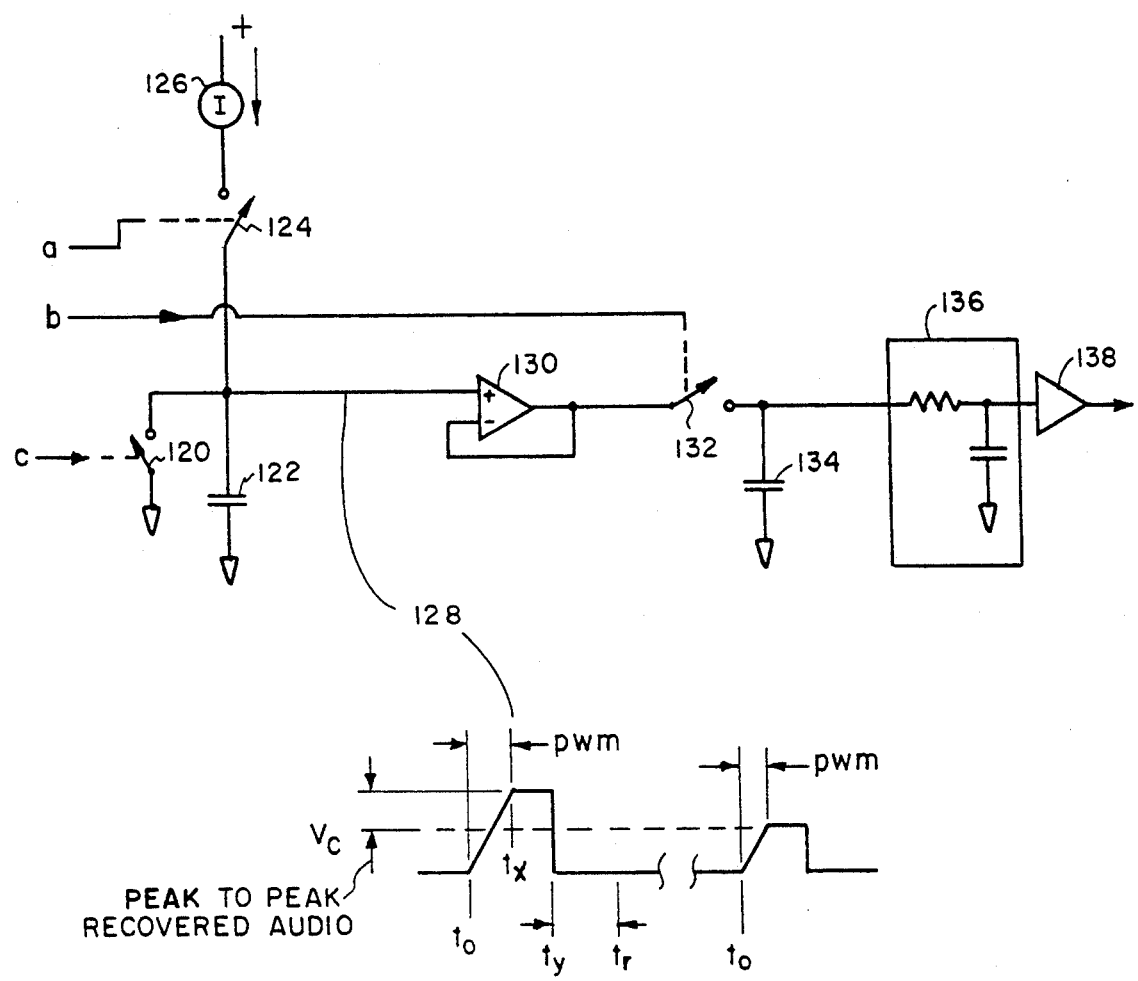

Referring now to FIGS. 2.A and B, the received reconstituted signal 76 is applied to a sync separator 78 which extracts the PWM pulse 72 which corresponds to the PWM output of the comparator 66 of FIG. 1. As in the case of FIG. 1, all the switches are shown in a normal "off" position and $t_c$ on the various waveforms indicates the beginning of the color burst 18. In one path the pulse 72 enters a one-shot multivibrator 80 whose time duration is much less than the PWM pulse 72 which with capacitor 82 and a switch 84 produces a DC restored video signal 89 similar to signal 30 in the transmission end in FIG. 1. Also, pulse 72 is applied through an inverter 85 to a one-shot multivibrator 86 which produces a pulse 87 occurring after the pulse width modulation to produce a sample and hold condition for the back porch voltage through a switch 88 and a capacitor 90. A buffer amplifier 92 prevents the decay of the voltage at capacitor 90.

In another path, the PWM pulse 72 is applied to a one-shot multivibrator 98 whose output is a fixed width pulse 100 which operates a switch 96. A resistor 94 and switch 96 operated by the pulse 100 recreates a standard horizontal sync pulse 14 at switch 102. The pulse 100 is also applied to a one-shot multivibrator 104 for generating a delayed horizontal pulse 105 which is applied to the OR gate 106 for generating a control pulse 108 controlling switch 102. The time duration for the pulse 108 is sufficiently long to eclipse the pulse width modulation at the input. Otherwise if switch 102 is unconnected to the video input 89 within the period of the PWM, an extraneous pulse might enter the recovered video output 10 and prevent the recovery of the corresponding original composite video signal 10 applied to the transmitting end of the system illustrated in FIG. 1.

In addition, pulse 100 applied to the inverter 99 provides pulse 110 which controls a switch 112 which essentially permits all frequencies in the band pass of a color burst filter 114 to pass, except during the fixed sync time of pulse 100. Switch 112 essentially allows the color burst 18 to be added after the horizontal sync pulse and along with switch 102 restores the back porch voltage to the original received video and the reconstructed horizontal fixed pulse.

Sample and hold pulse 87 generated from the one-shot multivibrator 86 has a dual function of sampling the recovered audio at the horizontal line rate. Pulse 87 also generates a reset pulse 118 from a one-shot multivibrator 116. Pulse 118 closes a switch 120 (see FIG. 2.B) which initializes the charge on a capacitor 122 to reference ground through the switch 120. After reset $(t_y - t_r)$, as the initializing state, a switch 124 is held closed through the PWM time by pulse 72. A constant current generator 126 charges capacitor 122 in a linear fashion over time as long as switch 124 is held closed. Accordingly, the peak voltage depicted in wave form 128 is proportional to the PWM as shown diagrammatically in the wave form 128. A buffer amplifier 130 protects this charge and transfers the voltage to its output whereupon switch 132 and capacitor 134 stores the voltage (for horizontal line time) during the sample and hold time provided by pulse 87 which immediately occurs at the completion of the peak of the ramp voltage indicated as $t_x$ in the waveform 128. A low pass filter 136 is used to smooth out any unwanted higher frequencies to produce the recovered audio output 138.

Figure 3:
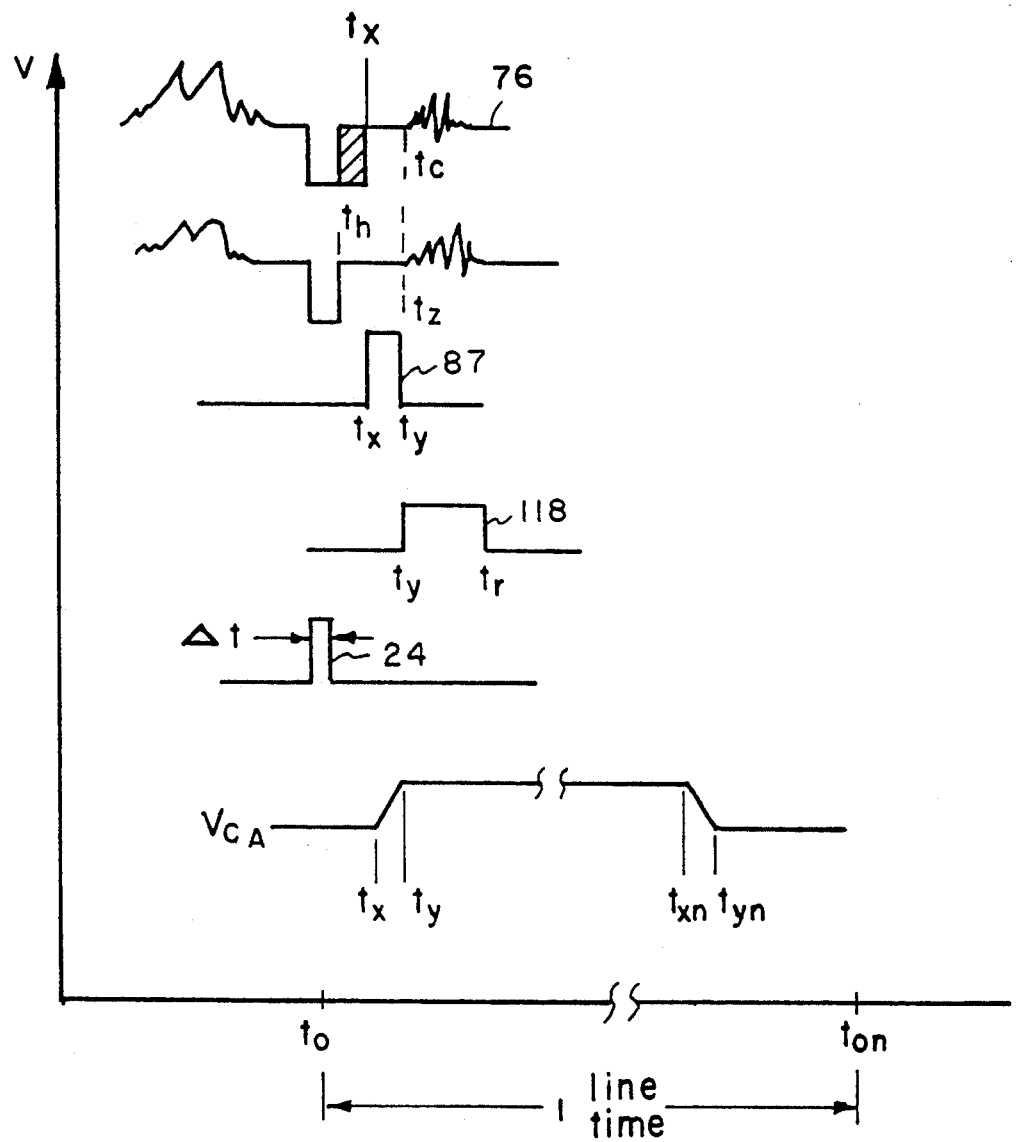
FIG. 3 is a plot of voltage versus time for a plurality of wave forms indicating the relative timing of the various signals in FIGS. 2 A and B.

FIG. 3 shows the relative timing of the various signals in FIG. 2 over a one line time period in the form of a plurality of voltage versus time plots.

Accordingly, a very practical and economical method and apparatus is presented for a communications system over ordinary wires in which a television sync pulse is modulated by an audio signal to vary its width which enables a normal video signal to carry additional information which can be recovered by demodulation at the receiving end. The audio information is sampled at the line rate and the sync pulse is varied in accordance with the audio amplitude on the transmission end while the width is synchronously detected and converted to amplitude at the receiving end. The frequency of transmission of the audio is limited by Nyquist theory on sampling rate. An added feature of the present invention permits the passing of the color burst signal which could become lost in the modulation process. In the method and apparatus of the present invention, the horizontal sync pulse is actually extracted from the composite video signal, modulated, and then reinserted while preserving all the original levels and signals surrounding the replaced area. On demodulation, the pulse width modulated horizontal sync pulse is again separated, demodulated and the sync pulse is then reinserted while preserving the original areas and signals to reconstitute the original video signal without change.

Since other changes and modifications vary to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A closed circuit television communication system for the transmission and reception of video signals over wires in which separated horizontal sync pulses of an original video signal are pulse width modulated by an audio signal, enabling the video signal to carry additional information which can be recovered on reception comprising:

an original video signal containing horizontal sync pulses, means for separating said horizontal sync pulses from said original video signal, means for forming pulse width modulated pulses which vary with an audio input signal, said means for forming said pulse width modulated pulses includes means for producing stretched pulses which have a longer duration than said horizontal sync pulses of said original video signal, said stretched pulses being used to generate a linearly varying voltage with respect to time over a period of time determined by said stretched pulses, means for replacing said horizontal sync pulses of said original video signal with said pulse width modulated pulses while preserving the original video signal levels surrounding said pulse width modulated pulses thereby providing a reconstituted video signal, means for transmitting said reconstituted video signal over wire, reception means coupled to said wire for receiving said reconstituted video signal, sync separating means for separating said pulse width modulated pulses from said reconstituted video signal, means for demodulating said pulse width modulated signals to produce an audio signal output.

2. The system as claimed in claim 1 having said stretched pulses coupled by a switch to a capacitor and a constant current generator, a comparator having an audio input applied thereto, said capacitor and constant current generator coupled to said comparator for producing a pulse width which varies linearly with the said audio input.

3. The system as claimed in claim 1 including first capacitor means having said original video signal coupled thereto for providing a DC restored video signal, a one-shot multivibrator coupled to said means for separating said horizontal sync pulses for providing a sample and hold pulse after said horizontal sync pulses, a first switch means having said sample and hold pulse applied thereto, and a second capacitor coupled to said switch means for storing the voltage occurring in said video signals subsequent to said sync pulses.

4. The system as claimed in claim 3 having a band pass filter coupled to said first capacitor means for passing color bursts in said DC restored video signal.

5. The system as claimed in claim 4 having second switch means for combining said DC restored video signal, color bursts and pulse width modulated pulses for providing said reconstituted video signal.

6. The system as claimed in claim 1 including a first capacitor having said reconstituted video signal applied thereto, a first switch coupled to said first capacitor and a one-shot multivibrator coupled between said separated pulse width modulated pulses and said first switch for providing a DC restored video signal utilized in said means for reconstituting said original video signal.

7. The system as claimed in claim 6 having a second one-shot multivibrator coupled to said sync separator means, a second switch means having a resistor connected thereto, said second switch means operated by said second one-shot multivibrator for generating a standard horizontal synch pulse.

* * * * *